US012640150B2

(12) United States Patent
Goldshtein

(10) Patent No.: US 12,640,150 B2
(45) Date of Patent: May 26, 2026

(54) VOICE-BASED CHATBOT POLICY OVERRIDE(S) FOR EXISTING VOICE-BASED CHATBOT(S)

(71) Applicant: GOOGLE LLC, Mountain View, CA (US)

(72) Inventor: Sasha Goldshtein, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 217 days.

(21) Appl. No.: 18/228,411

(22) Filed: Jul. 31, 2023

(65) Prior Publication Data

US 2025/0046305 A1 Feb. 6, 2025

(51) Int. Cl.
*G10L 15/22* (2006.01)
*H04L 51/02* (2022.01)

(52) U.S. Cl.
CPC .............. *G10L 15/22* (2013.01); *H04L 51/02* (2013.01)

(58) Field of Classification Search
None
See application file for complete search history.

(56) References Cited

U.S. PATENT DOCUMENTS 6,059,842 A * 5/2000 Dumarot ............. G06F 9/44505
715/965
10,795,640 B1 * 10/2020 Knight .................. G06F 3/0482

11,341,335 B1 5/2022 Crook
2014/0244712 A1 * 8/2014 Walters .................. H04L 67/10
709/202
2015/0186156 A1 * 7/2015 Brown .................... H04L 51/02
715/706

(Continued)

OTHER PUBLICATIONS

Marin, A. et al., "Flexible, Rapid Authoring of Goal-Oriented, Multi-Turn Dialogues Using the Task Completion Platform"; retrieved from the Internet: URL:https://www.microsoft.com/en-us/research/wp-content/uploads/2016/07/IS2016DemoPolicy-ruhi.pdf; 2 pages; dated Jul. 24, 2016.

(Continued)

*Primary Examiner* — Jonathan C Kim
(74) *Attorney, Agent, or Firm* — Gray Ice Higdon

(57) ABSTRACT

Implementations are directed to generating voice-based chatbot policy override(s) and/or utilizing voice-based chatbot policy override(s) in conjunction with existing voice-based chatbot(s). The voice-based chatbot policy override(s) can correspond to, for example, machine learning (ML) model(s) that supplement functionality of the existing voice-based chatbot(s). Notably, the voice-based chatbot policy override(s) are associated with rule(s) (e.g., by virtue of training the ML model(s) that correspond to the voice-based chatbot policy override(s)) for when the voice-based chatbot policy override(s) should be utilized in lieu of the existing voice-based chatbot(s) in responding to spoken utterance(s) of human user(s) engaged in corresponding conversation(s) with the voice-based chatbot policy override(s). Nonetheless, from a perspective of the human user(s), it appears as if they are still engaging in the corresponding conversations with the existing voice-based chatbot(s). Thus, the functionality of the existing voice-based chatbot(s) can be supplemented without having to re-train the existing voice-based chatbot(s).

20 Claims, 5 Drawing Sheets

(56)          References Cited

U.S. PATENT DOCUMENTS

| | | | |
|---|---|---|---|
| 2016/0070696 A1* | 3/2016 | Lavallee | G06F 16/90332 704/9 |
| 2017/0269975 A1* | 9/2017 | Wood | G10L 15/1815 |
| 2019/0213490 A1* | 7/2019 | White | G06N 5/043 |
| 2019/0340527 A1 | 11/2019 | Liden | |
| 2020/0294499 A1* | 9/2020 | DeLuca | G10L 25/63 |
| 2020/0342850 A1* | 10/2020 | Vishnoi | H04L 51/214 |
| 2021/0136209 A1* | 5/2021 | Adibi | H04M 3/42102 |
| 2021/0365482 A1* | 11/2021 | Kim | G06F 13/00 |
| 2022/0005470 A1* | 1/2022 | Sugihara | B60K 35/10 |
| 2022/0067746 A1* | 3/2022 | Thakkar | G06N 20/00 |
| 2022/0116485 A1* | 4/2022 | Gandhi | H04L 51/216 |
| 2022/0129642 A1* | 4/2022 | Mohanty | G06F 40/35 |
| 2022/0156465 A1* | 5/2022 | Crook | G06V 40/16 |
| 2022/0293093 A1 | 9/2022 | Beaufays et al. | |
| 2022/0351722 A1* | 11/2022 | Mandry | G10L 15/063 |
| 2024/0054292 A1* | 2/2024 | Chen | H04L 51/02 |
| 2024/0378393 A1* | 11/2024 | El Hattami | H04L 51/02 |
| 2024/0428002 A1* | 12/2024 | Elangovan | G06F 40/30 |
| 2025/0046305 A1* | 2/2025 | Goldshtein | G10L 15/22 |
| 2025/0095632 A1* | 3/2025 | Goldshtein | G10L 13/00 |
| 2025/0097168 A1* | 3/2025 | Goldshtein | G10L 13/08 |
| 2025/0106321 A1* | 3/2025 | Reyes | G10L 13/08 |
| 2025/0218423 A1* | 7/2025 | Goldshtein | G10L 13/10 |

OTHER PUBLICATIONS

European Patent Office; International Search Report and Written Opinion issued in Application No. PCT/US2024/035399; 17 pages; dated Sep. 5, 2024.

European Patent Office; Intention to Grant issued in Application No. 24739992.6, 61 pages, dated Dec. 8, 2025.

* cited by examiner

300

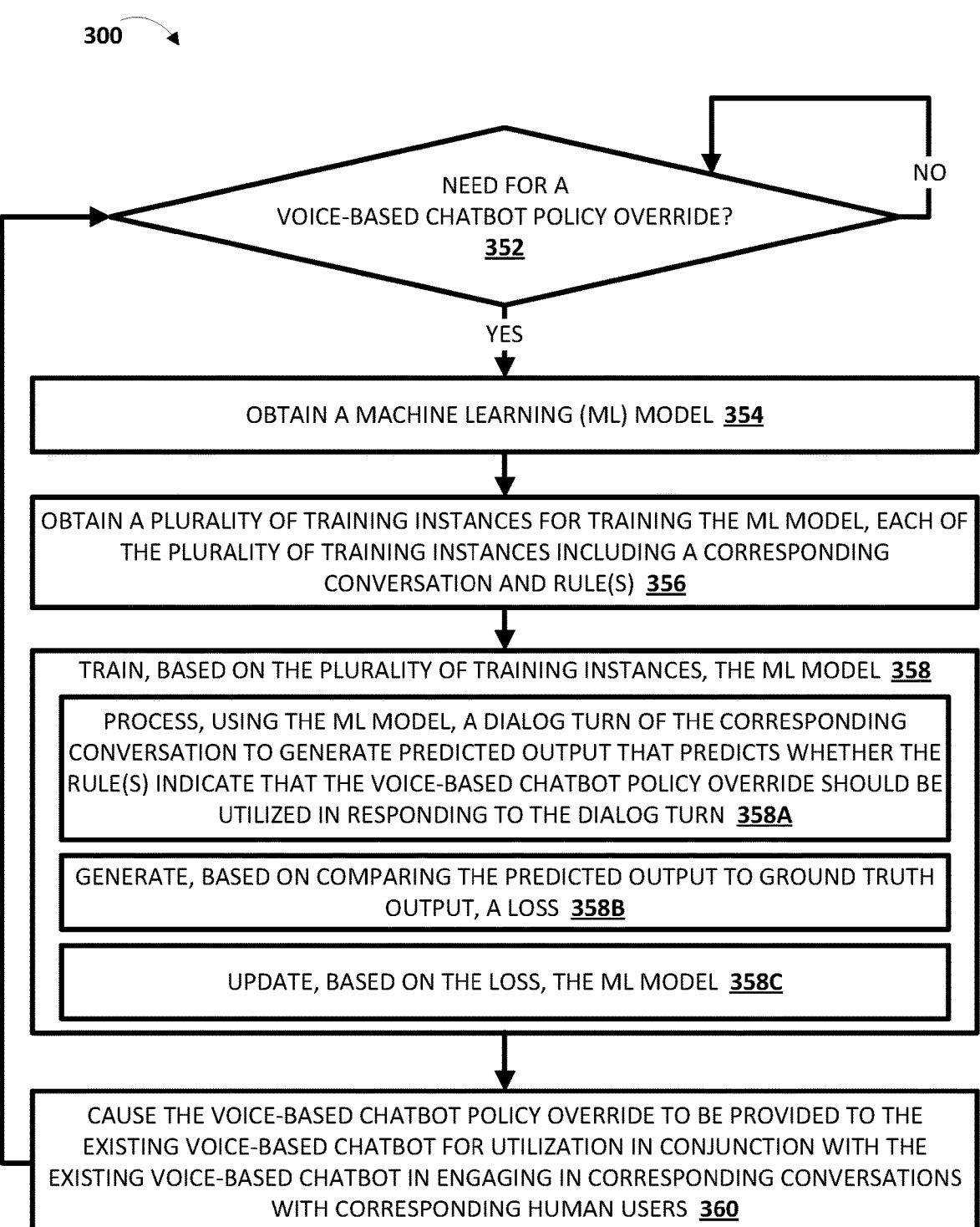

NEED FOR A
VOICE-BASED CHATBOT POLICY OVERRIDE?
352

NO

YES

OBTAIN A MACHINE LEARNING (ML) MODEL 354

OBTAIN A PLURALITY OF TRAINING INSTANCES FOR TRAINING THE ML MODEL, EACH OF THE PLURALITY OF TRAINING INSTANCES INCLUDING A CORRESPONDING CONVERSATION AND RULE(S) 356

TRAIN, BASED ON THE PLURALITY OF TRAINING INSTANCES, THE ML MODEL 358

PROCESS, USING THE ML MODEL, A DIALOG TURN OF THE CORRESPONDING CONVERSATION TO GENERATE PREDICTED OUTPUT THAT PREDICTS WHETHER THE RULE(S) INDICATE THAT THE VOICE-BASED CHATBOT POLICY OVERRIDE SHOULD BE UTILIZED IN RESPONDING TO THE DIALOG TURN 358A

GENERATE, BASED ON COMPARING THE PREDICTED OUTPUT TO GROUND TRUTH OUTPUT, A LOSS 358B

UPDATE, BASED ON THE LOSS, THE ML MODEL 358C

CAUSE THE VOICE-BASED CHATBOT POLICY OVERRIDE TO BE PROVIDED TO THE EXISTING VOICE-BASED CHATBOT FOR UTILIZATION IN CONJUNCTION WITH THE EXISTING VOICE-BASED CHATBOT IN ENGAGING IN CORRESPONDING CONVERSATIONS WITH CORRESPONDING HUMAN USERS 360

FIG. 3

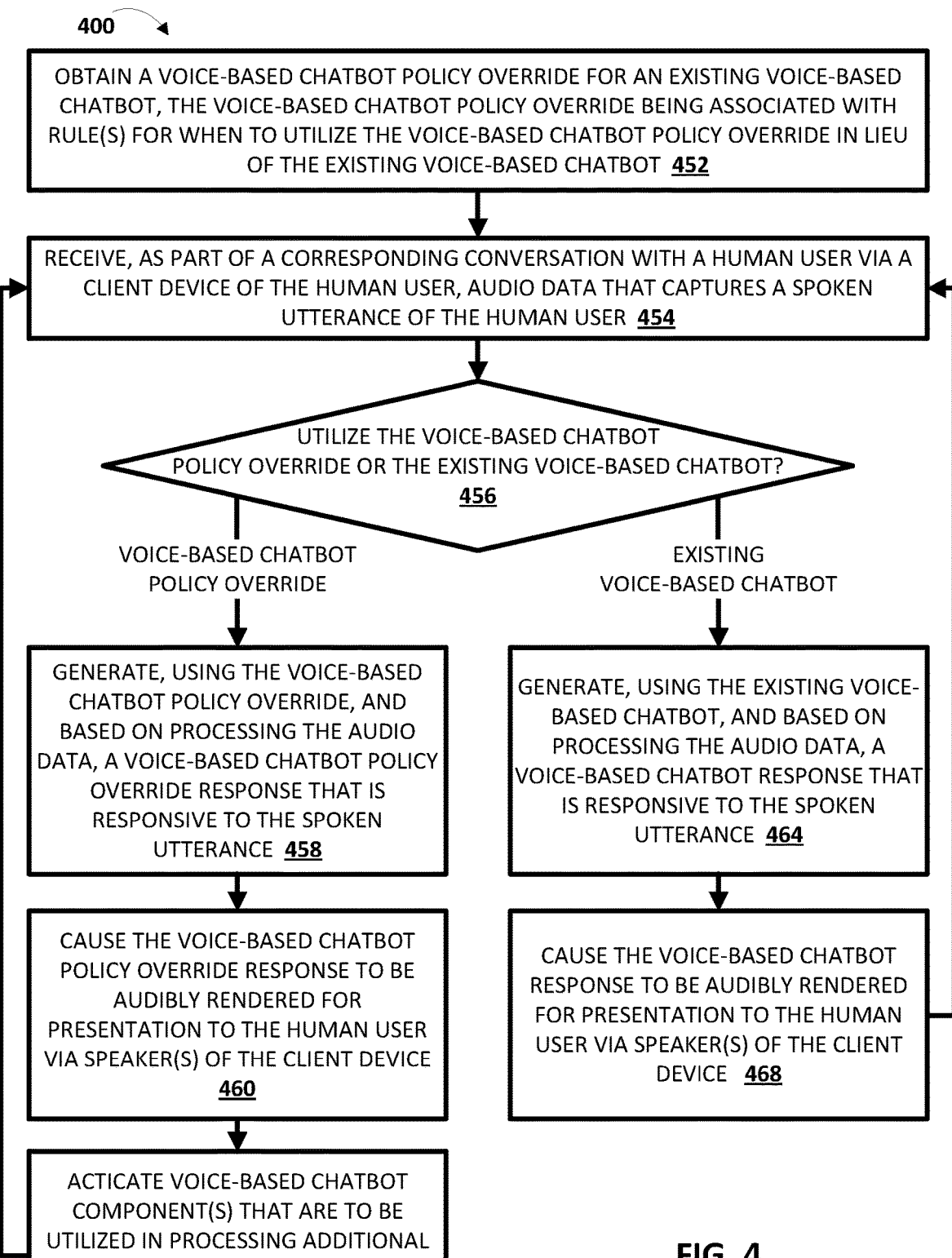

400

OBTAIN A VOICE-BASED CHATBOT POLICY OVERRIDE FOR AN EXISTING VOICE-BASED CHATBOT, THE VOICE-BASED CHATBOT POLICY OVERRIDE BEING ASSOCIATED WITH RULE(S) FOR WHEN TO UTILIZE THE VOICE-BASED CHATBOT POLICY OVERRIDE IN LIEU OF THE EXISTING VOICE-BASED CHATBOT 452

RECEIVE, AS PART OF A CORRESPONDING CONVERSATION WITH A HUMAN USER VIA A CLIENT DEVICE OF THE HUMAN USER, AUDIO DATA THAT CAPTURES A SPOKEN UTTERANCE OF THE HUMAN USER 454

UTILIZE THE VOICE-BASED CHATBOT POLICY OVERRIDE OR THE EXISTING VOICE-BASED CHATBOT? 456

VOICE-BASED CHATBOT POLICY OVERRIDE

EXISTING VOICE-BASED CHATBOT

GENERATE, USING THE VOICE-BASED CHATBOT POLICY OVERRIDE, AND BASED ON PROCESSING THE AUDIO DATA, A VOICE-BASED CHATBOT POLICY OVERRIDE RESPONSE THAT IS RESPONSIVE TO THE SPOKEN UTTERANCE 458

GENERATE, USING THE EXISTING VOICE-BASED CHATBOT, AND BASED ON PROCESSING THE AUDIO DATA, A VOICE-BASED CHATBOT RESPONSE THAT IS RESPONSIVE TO THE SPOKEN UTTERANCE 464

CAUSE THE VOICE-BASED CHATBOT POLICY OVERRIDE RESPONSE TO BE AUDIBLY RENDERED FOR PRESENTATION TO THE HUMAN USER VIA SPEAKER(S) OF THE CLIENT DEVICE 460

CAUSE THE VOICE-BASED CHATBOT RESPONSE TO BE AUDIBLY RENDERED FOR PRESENTATION TO THE HUMAN USER VIA SPEAKER(S) OF THE CLIENT DEVICE 468

ACTICATE VOICE-BASED CHATBOT COMPONENT(S) THAT ARE TO BE UTILIZED IN PROCESSING ADDITIONAL AUDIO DATA THAT CAPTURES AN ADDITIONAL SPOKEN UTTERANCE PROVIDED BY THE HUMAN USER 462

FIG. 4

VOICE-BASED CHATBOT POLICY OVERRIDE(S) FOR EXISTING VOICE-BASED CHATBOT(S)

BACKGROUND

Humans may engage in human-to-computer dialogs with interactive software applications referred to as "chatbots," "automated assistants", "intelligent personal assistants," etc. (referred to herein as "chatbots"). As one example, these chatbots may correspond to a machine learning model or a combination of different machine learning models, and may be utilized to perform various tasks on behalf of users. For instance, some of these chatbots can conduct conversations with various humans to perform action(s) on behalf of an another human or on behalf of an entity. In some of these instances, the conversations conducted by these chatbots can include voice-based conversations (these chatbots are referred to herein as "voice-based chatbots"), such as conversations conducted locally at a computing device, conducted remotely over multiple computing devices via a telephonic network or other network, or other voice-based scenarios.

However, functionality of some these voice-based chatbots may be limited in various manners. For example, functionality of some these voice-based chatbots may be limited by pre-defined intent schemas that the voice-based chatbots utilize to perform the action(s). In other words, if a human that is engaged in a given conversation with a given voice-based chatbot provides a spoken utterance that is determined to include an intent not defined by the pre-defined intent schemas, the given voice-based chatbot may fail. Further, to update these voice bots, existing intent schemas may be modified or new intent schemas may be added. As another example, functionality of some these voice bots may be limited by a corpus of examples utilized to train the voice-based chatbots. In other words, if a human that is engaged in a given conversation with a given voice-based chatbot provides a spoken utterance that was not included in the given corpus of examples, the given voice-based chatbot may fail. Further, to update these voice-based chatbots, existing examples in the corpus may be modified or new examples may be added. However, in both of these examples, there are virtually limitless intent schemas and/or examples that may need to be previously defined to make the voice-based chatbots robust to various nuances of human speech and to mitigate instances of failure.

Notably, extensive utilization of computational resources is required to manually define and/or manually refine such intent schemas and/or examples, and to re-train these voice-based chatbots. Further, even if a large quantity of intent schemas and/or examples are defined, a large amount of memory is required to store and/or utilize the large quantity of intent schemas for these voice-based chatbots, and/or to re-train these voice-based chatbots based on the large quantity of examples in the corpus. Accordingly, there is a need in the art for techniques to modify and/or supplement functionality of these voice-based chatbots in a more computationally efficient manner.

SUMMARY

Implementations are directed to generating voice-based chatbot policy override(s) and/or utilizing voice-based chatbot policy override(s) in conjunction with existing voice-based chatbot(s). The voice-based chatbot policy override(s) can correspond to, for example, machine learning (ML)

model(s) that supplement functionality of the existing voice-based chatbot(s). Notably, the voice-based chatbot policy override(s) are associated with rule(s) (e.g., by virtue of training the ML model(s) that correspond to the voice-based chatbot policy override(s)) for when the voice-based chatbot policy override(s) should be utilized, in lieu of the existing voice-based chatbot(s), in responding to spoken utterance(s) of human user(s) engaged in corresponding conversation(s) with the voice-based chatbot policy override(s). Nonetheless, from a perspective of the human user(s), it appears as if they are still engaging in the corresponding conversations with the existing voice-based chatbot(s). Thus, the functionality of the existing voice-based chatbot(s) can be supplemented without having to re-train the existing voice-based chatbot(s).

In some implementations, processor(s) of a voice-based chatbot policy override system can determine whether there is a need to provide a voice-based chatbot policy override to supplement current functionality of the existing voice-based chatbot and without having to re-train the existing voice-based chatbot. In some versions of those implementations, the processor(s) can reactively determine that there is a need to provide the voice-based chatbot policy override in response to receiving a request from an entity that manages the existing voice-based chatbot or an additional entity that is in addition to both an entity that manages the existing voice-based chatbot and an entity that manages the voice-based chatbot policy override system. In additional or alternative versions of those implementations, the processor(s) can proactively determine that there is a need to provide the voice-based chatbot policy override (e.g., based on a law or regulation being passed in certain geographical area(s) in which the human user(s) that interact with the existing voice-based chatbot are located).

In various implementations, and in response to determining that there is a need to provide a voice-based chatbot policy override to supplement current functionality of the existing voice-based chatbot, the processor(s) can generate the voice-based chatbot policy override. Notably, the rule(s) utilized in training the ML model(s) that correspond to the can be included in the request when the processor(s) reactively determine that there is a need to provide the voice-based chatbot policy override or can be proactively determined when the processor(s) proactively determine that there is a need to provide the voice-based chatbot policy override. Further, not only can the rule(s) indicate when the voice-based chatbot policy override should be utilized, in lieu of the existing voice-based chatbot(s), in responding to spoken utterances of human users, but the rule(s) can also indicate how the voice-based chatbot policy override should respond to the spoken utterances of the human users.

For example, in generating the voice-based chatbot policy override, the processor(s) can obtain a ML model (e.g., a question-answering (Q-A) model, a large language model (LLM), a recurrent neural network (RNN) model, a transformer model, and/or other ML models that optionally employ an attention mechanism or other memory), obtain a plurality of training instances, and train the ML model based on the plurality of training instances to generate the voice-based chatbot policy override. A given training instance, of the plurality of training instances, can include, for example, a dialog turn of a corresponding conversation and the rule(s) that are associated with the voice-based chatbot policy override. In training the ML model based on the given training instance, the processor(s) can process, using the ML model, the dialog turn of the corresponding conversation to generate predicted output that predicts whether the rule(s)

indicate that the voice-based chatbot policy override should be utilized in responding to the dialog turn. Further, the processor(s) can generate, based on comparing the predicted output to ground truth output, a loss. The ground truth output can indicate, for example, whether the voice-based chatbot policy override, in fact, should be utilized in responding to the dialog turn. Thus, the processor(s) can update, based on the loss, the ML model, and can repeat this for each of the plurality of training instances to generate the voice-based chatbot policy override.

In various implementations, and subsequent to the voice-based chatbot policy override being generated, the processor(s) can provide the voice-based chatbot policy override to the existing voice-based chatbot to cause the voice-based chatbot policy override to be utilized in conjunction with the existing voice-based chatbot. Notably, the voice-based chatbot policy override can be implemented "in front of" the existing voice-based chatbot in terms of processing audio data that captures spoken utterance(s) received from a human user during a corresponding conversation. Put another way, component(s) of the voice-based chatbot policy override can initially process the audio data that captures the spoken utterance(s) received from the human user prior to any component(s) of the existing voice-based chatbot policy processing the audio data that captures the spoken utterance(s).

For example, assume that a human user is engaged in a corresponding conversation with the existing voice-based chatbot that is being utilized in conjunction with the voice-based chatbot policy override to conduct the corresponding conversation. In this example, processor(s) of the voice-based chatbot policy override can determine whether it should be utilized in responding to the spoken utterance(s) and based on at least the rule(s) that were utilized in generating the voice-based chatbot policy override. In response to the processor(s) determining that it should respond to the spoken utterance(s), the processor(s) can continue with processing of the audio data to generate a voice-based chatbot policy override response that is responsive to the spoken utterance(s). In contrast, in response to the processor(s) determining that the existing voice-based chatbot should be respond to the spoken utterance(s), the processor(s) can pass the processing of the audio data to the existing voice-based chatbot to cause a voice-based chatbot response that is responsive to the spoken utterance(s). The voice-based chatbot policy override response or the voice-based chatbot response can be audibly rendered for presentation to the human user. However, it may appear, from a perspective of the human user, that the existing voice-based chatbot generated the voice-based chatbot policy override response.

Notably, whether the processor(s) of the voice-based chatbot policy override determines that the voice-based chatbot policy override should be utilized in responding to the spoken utterance(s) or that the existing voice-based chatbot should be utilized in responding to the spoken utterance(s) may be dependent on the rule(s) that were utilized in generating the voice-based chatbot policy override, and the rule(s) may be dependent on various requests that are received by the voice-based chatbot policy override system. Thus, it should be understood that instances in which the voice-based chatbot policy override are utilized, and in lieu of the existing voice-based chatbot, in responding to the spoken utterance, and how the voice-based chatbot policy override responds in those instances, are virtually limitless.

For instance, in some implementations, the processor(s) of the voice-based chatbot policy override can determine that it should be utilized in responding to the spoken utterance based on processing the audio data capturing the spoken utterance(s). In some versions of these implementations, the processor(s) can process, using an automatic speech recognition (ASR) model the audio data capturing the spoken utterance(s) to generate ASR output, such as recognized text that is predicted to correspond to the spoken utterance(s) captured in the audio data. In some further versions of those implementations, the processor(s) can process, using a natural language understanding (NLU) model, the ASR output to generate NLU output, such as intent(s) and slot value(s) for corresponding parameter(s) associated with the intent(s). In additional or alternative further versions of those implementations, the processor(s) can process, using a LLM, the ASR output to generate LLM output, such as a probability distribution over a sequence of tokens, such as words, word pieces, intent(s), slot value(s) for corresponding parameter(s) associated with the intent(s), and/or other tokens. In these implementations, the processor(s) of the voice-based chatbot policy override can determine that it should be utilized in responding to the spoken utterance based on the ASR output, the NLU output, and/or the LLM output.

Some non-limiting examples of when the voice-based chatbot policy override may be associated with one or more rules that are based on processing the audio data capturing the spoken utterance can include, for instance, the voice-based chatbot policy override including functionality that is to be invoked based on the human user speaking one or more particular phrases, such as the human user requesting to speak to another human user, the human user inquiring whether the existing voice-based chatbot is a human or a machine, or the human user requesting that the existing voice-based chatbot interact with one or more external systems for which it was not trained to interact with (e.g., an inventory system, a reservation system, an authorization system, etc.). Although the above examples are provided, it should be understood that the purpose of the voice-based chatbot policy override can be virtually limitless.

Also, for instance, in additional or alternative implementations, the processor(s) of the voice-based chatbot policy override can determine that it should be utilized in responding to the spoken utterance based on a temporal period during which the corresponding conversation is initiated. For example, the temporal period can indicate that the voice-based chatbot policy override should be utilized only during certain times of day, certain days of the week, certain days of the month, certain days of the year, etc. Accordingly, if the corresponding conversation is initiated during one of these temporal periods, then the processor(s) can determine that the voice-based chatbot policy override should be utilized in responding to the spoken utterance. Otherwise, the processor(s) can determine that the existing voice-based chatbot should be utilized in responding to the spoken utterance. One non-limiting examples of when the voice-based chatbot policy override may be associated with one or more rules that include a location constraint can include, for instance, the voice-based chatbot policy override including functionality that is required by recently passed laws or regulations, which may differ from geographical area to geographical area.

Also, for instance, in additional or alternative implementations, the processor(s) of the voice-based chatbot policy override can determine that it should be utilized in responding to the spoken utterance based on a location constraint associated with a geographic region of the human user. For example, the location constraint can indicate that the voice-based chatbot policy override should be utilized if a current location of the human user (e.g., determined based on location sensor(s) of the client device of the human user, determined based on user profile data of a user profile of the human user, etc.) is within a certain geographical area. Accordingly, if the corresponding conversation is initiated while the human user is subject to the location constraint, then the processor(s) can determine that the voice-based chatbot policy override should be utilized in responding to the spoken utterance. Otherwise, the processor(s) can determine that the existing voice-based chatbot should be utilized in responding to the spoken utterance.

In various implementations, and assuming that the processor(s) determine that the voice-based chatbot policy override should be utilized in responding to the spoken utterance, the processor(s) can send a signal to the existing voice-based chatbot to activate component(s) of the existing voice-based chatbot. The components can include, for example, an ASR component; a NLU component; a fulfillment component; and/or an LLM component. Accordingly, latency can be reduced in responding to the additional spoken utterance provided by the human user of the client device. However, it should be noted that the voice-based chatbot policy override may handle multiple turns of the corresponding conversation, and the processor(s) may only selectively send this signal to the existing voice-based chatbot.

By E using the techniques described herein, various technical advantages can be achieved. As one non-limiting example, by generating the voice-based chatbot policy override and causing the voice-based chatbot policy override to be utilized in conjunction with an existing voice-based chatbot, computational resources can be conserved. For instance, the computational resources consumed in training the ML model(s) that correspond to the voice-based chatbot policy override can be vastly less than the computational resources consumed in re-training the ML model(s) that correspond to the existing voice-based chatbot. This is the result of the ML model(s) corresponding to the voice-based chatbot policy override being trained for one or more specific purposes than having to be a fully functioning voice-based chatbot that is more robust. As another non-limiting example, by activating the component(s) of the existing voice-based chatbot while the voice-based chatbot policy overrides generates a response to the spoken utterance, latency in processing subsequent spoken utterance(s) provided by the user can be reduced. For instance, the existing voice-based chatbot need not initiate various processing components in response to receiving the subsequent spoken utterance(s) since they are already initiated.

The above description is provided as an overview of only some implementations disclosed herein. Those implementations, and other implementations, are described in additional detail herein.

BRIEF DESCRIPTION OF THE DRAWINGS

FIG. 3 depicts a flowchart illustrating an example method of generating a voice-based chatbot policy override, in accordance with various implementations.

FIG. 4 depicts a flowchart illustrating an example method of determining whether to utilize a voice-based chatbot policy override or an existing voice-based chatbot in generating a response during a corresponding conversation with a human user, in accordance with various implementations.

DETAILED DESCRIPTION

Figure 1:
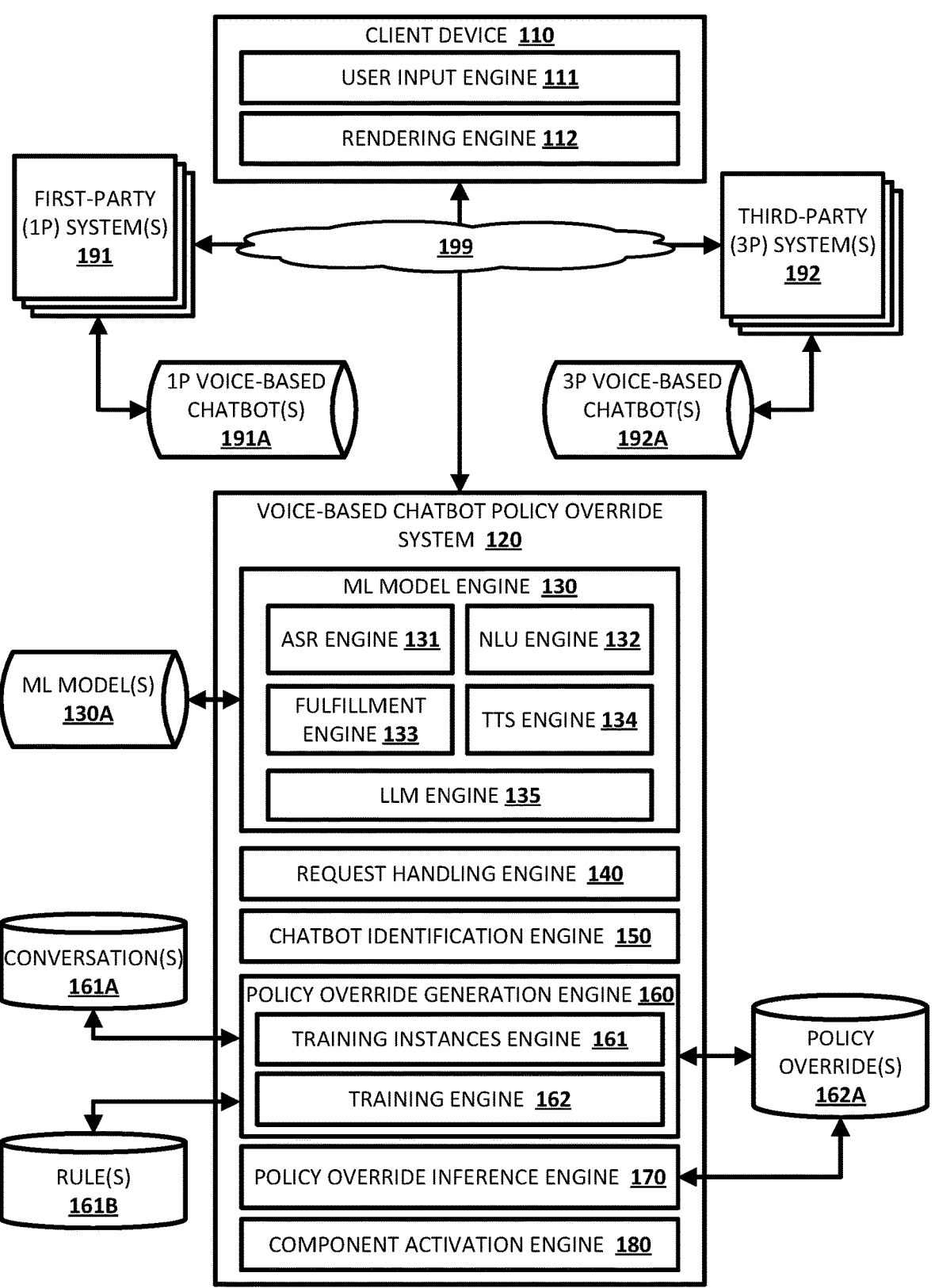
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, a user input engine 111 and a rendering engine 112. The client device 110 can be, for example, a standalone device (e.g., having microphone(s), vision component(s), speaker(s), display(s), and/or other user interface components), a laptop, a desktop computer, a tablet, a wearable computing device, a vehicular computing device, and/or any other client device capable of being utilized to engage in a corresponding conversation with a voice-based chatbot.

The user input engine 111 can detect various types of user input at the client device 110. In some examples, the user input detected at the client device 110 can include spoken utterance(s) of a human user of the client device 110 that is detected via microphone(s) of the client device 110. In these examples, the microphone(s) of the client device 110 can generate audio data that captures the spoken utterance(s). In other examples, the user input detected at the client device 110 can include touch input of a human user of the client device 110 that is detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 112 can cause responsive content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The responsive content and/or other output can include, for example, dialog content corresponding to a voice-based chatbot policy override response as described herein (e.g., with respect to FIGS. 2 and 4), a voice-based chatbot response as described herein (e.g., with respect to FIGS. 2 and 4), and/or other dialog content.

Further, the client device 110 is also illustrated in FIG. 1 as communicatively coupled, over one or more networks 199 (e.g., any combination of Wi-Fi, Bluetooth, or other local area networks (LANs); ethernet, the Internet, or other wide area networks (WANs); and/or other networks), to various first-party ("1P") systems 191 that have access to respective 1P voice-based chatbots (e.g., via database 191A) and to various third-party ("3P") systems 192 that have access to respective 3P voice-based chatbots (e.g., via database 192A). As used herein, the term "first-party" or "first-party entity" refers to an entity that develops and/or maintains the voice-based chatbot policy override system 120, whereas the term "third-party" or "third-party entity" refers to an entity that is distinct from the entity that develops and/or maintains the voice-based chatbot policy override system 120. Accordingly, any voice-based chatbots that are developed and/or maintained by the entity that develops and/or maintains the voice-based chatbot policy override system 120 may be referred to as "first-party voice-based chatbots". Similarly, any voice-based chatbots that are developed and/or maintained by any entity other than the entity that develops and/or maintains the voice-based chatbot policy override system 120 may be referred to as "third-party voice-based chatbots".

Moreover, the client device 110 is illustrated in FIG. 1 as communicatively coupled, over one or more of the networks 199, to a voice-based chatbot policy override system 120. The voice-based chatbot policy override system 120 can be, for example, a high-performance server, a cluster of high-performance servers, and/or any other computing device that is remote from the client device 110. The voice-based chatbot policy override system 120 includes, in various implementations, a machine learning (ML) model engine 130, a request handling engine 140, a chatbot identification engine 150, a policy override generation engine 160, a policy override inference engine 170, and a component activation engine 180. The ML model engine 130 can include various sub-engines, such as an automatic speech recognition (ASR) engine 131, a natural language understanding (NLU) engine 132, a fulfillment engine 133, a text-to-speech (TTS) engine 134, and a large language model (LLM) engine 135. These various sub-engines can utilize one or more respective ML models (e.g., stored in database 130A). Further, the policy override generation engine 160 can include various sub-engines, such as training instances engine 161 and training engine 162. These various sub-engines can utilize one or more corresponding conversations (e.g., stored in database 161A) and corresponding rules (e.g., stored in database 161B) to generate voice-based chatbot policy overrides (e.g., to be stored in database 162A).

As described herein, the voice-based chatbot policy override system 120 can be utilized to generate a voice-based chatbot policy override (e.g., as described with respect to FIG. 3). Further, the voice-based chatbot policy override system 120 can be utilized to cause the voice-based chatbot policy override to be utilized by the 1P system(s) 191 in conjunction with 1P voice-based chatbot(s) that have access to respective 1P voice-based chatbots (e.g., via database 191A) and/or to be utilized by the 3P system(s) 192 in conjunction with 3P voice-based chatbot(s) that have access to respective 3P voice-based chatbots (e.g., via database 192A) (e.g., as described with respect to FIGS. 2 and 4). The voice-based chatbot policy override can be, for example, a ML model, such as a question-answering (Q-A) ML model, a LLM, a recurrent neural network (RNN) ML model, a transformer ML model, and/or other ML models that optionally employ an attention mechanism or other memory. While the 1P voice-based chatbots and/or the 3P voice-based chatbots are engaged in corresponding conversations with human users and generating voice-based chatbot responses to spoken utterances provided by the human user (e.g., using component(s) of the 1P voice-based chatbots and/or the 3P voice-based chatbots), the voice-based chatbot policy override can be selectively utilized in conjunction with the 1P voice-based chatbots and/or the 3P voice-based chatbots to generate voice-based chatbot policy override responses to spoken utterances provided by the human user or otherwise (e.g., using component(s) of the voice-based chatbot policy override).

Nonetheless, from the perspective of the human user that is engaged in the corresponding conversation with the 1P voice-based chatbots and/or the 3P voice-based chatbots, it may appear that the 1P voice-based chatbots and/or the 3P voice-based chatbots that are engaged in the corresponding conversations with the human users are effectively generating the voice-based chatbot policy override responses. Notably, the voice-based chatbot policy override can include functionality that is not capable of being performed by the 1P voice-based chatbots and/or the 3P voice-based chatbots without having to re-train the 1P voice-based chatbots and/or the 3P voice-based chatbots. Accordingly, the voice-based chatbot policy override can include functionality to supplement existing functionality of the 1P voice-based chatbots and/or the 3P voice-based chatbots without having to re-train the 1P voice-based chatbots and/or the 3P voice-based chatbots, thereby conserving computational resources. The 1P voice-based chatbots and the 3P voice-based chatbots are collectively referred to hereinafter as "voice-based chatbot" unless otherwise indicated.

Figure 2:
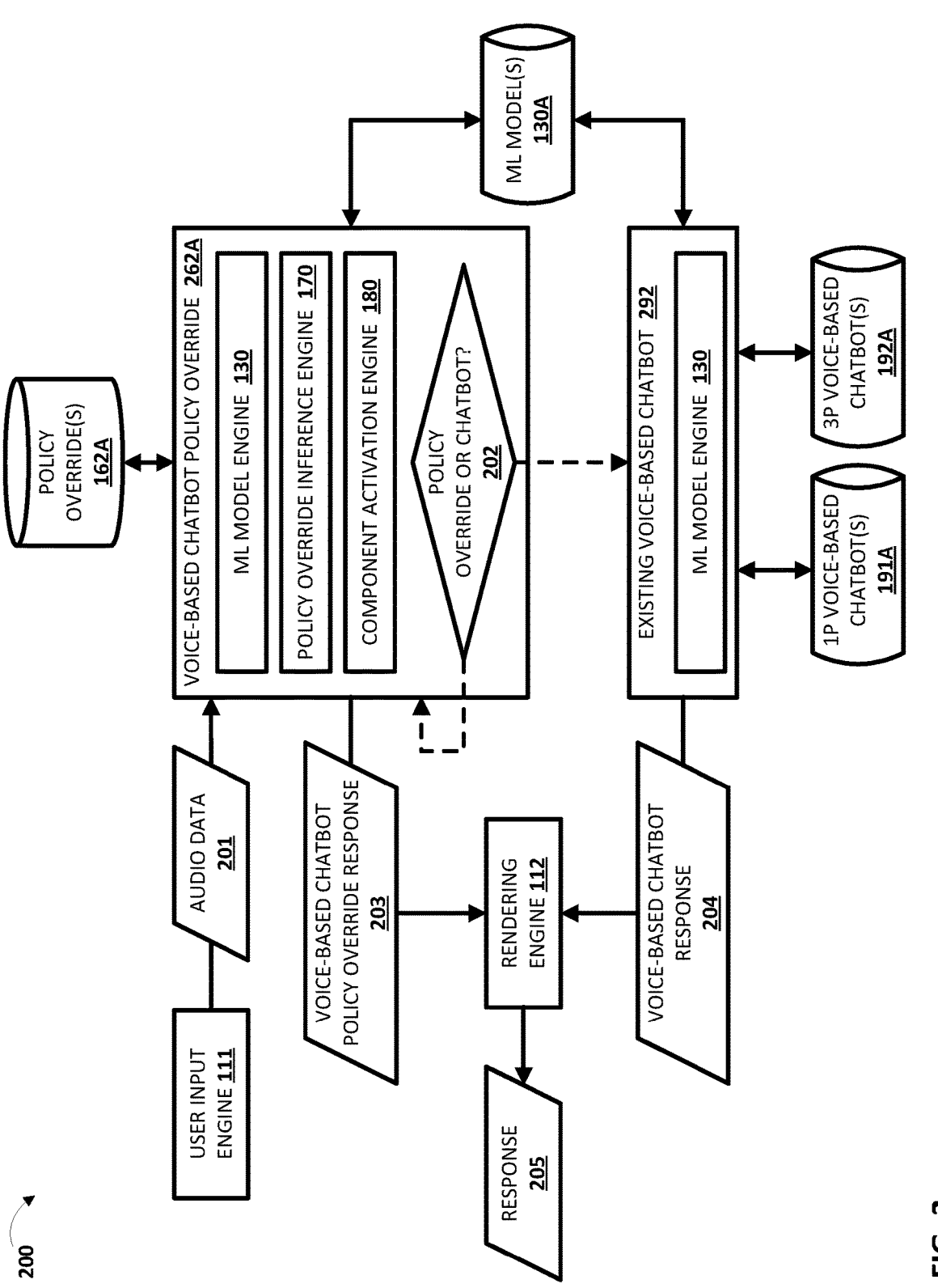
FIG. 2 depicts an example process flow for utilizing a voice-based chatbot policy override in conjunction with an existing voice-based chatbot, in accordance with various implementations.

The corresponding conversations that are described herein can be conducted by the voice-based chatbots in various manners. For example, the corresponding conversations can include corresponding conversations conducted during telephone calls (e.g., Voice over Internet Protocol (VoIP), public switched telephone networks (PSTN), and/or other telephonic communication protocols) and between the client device 110 and a voice-based chatbot, corresponding conversations conducted locally at the client device 110 in the voice-based chatbot is invoked at the client device 110, and/or in any other voice-based scenario in which the voice-based chatbot is deployed to conduct the corresponding conversations with users. Notably, in these corresponding conversations, the voice-based chatbot policy override can be selectively utilized in conjunction with one of the voice-based chatbot. Further, not only does the voice-based chatbot policy override have access to various components depicted in FIG. 1 (e.g., the ML model engine 130), but the voice-based chatbot may have access to the various components (e.g., the ML model engine 130 and the ML model(s) 130A as shown in FIG. 2) or other instances of the same or similar components.

In various implementations, the ASR engine 131 can process, using ASR model(s) stored in the ML model(s) database 130A (e.g., a recurrent neural network (RNN) model, a transformer model, and/or any other type of ML model capable of performing ASR), audio data that captures a spoken utterance and that is generated by microphone(s) of the client device 110 to generate ASR output. Further, the NLU engine 132 can process, using NLU model(s) stored in the ML model(s) database 130A (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 120 of the client device 110) to generate NLU output. Moreover, the fulfillment engine 133 can process, using fulfillment model(s) and/or fulfillment rules stored in the ML model(s) database 130A, the NLU data to generate fulfillment output. Additionally, the TTS engine 134 can process, using TTS model(s) stored in the ML model(s) database 130A, textual data (e.g., text formulated by a voice-based chatbot or a voice-based chatbot policy override) to generate synthesized speech audio data that includes computer-generated synthesized speech. Furthermore, in various implementations, the LLM engine 135 can replace one or more of the aforementioned components. For instance, the LLM engine 135 can replace the NLU engine 132 and/or the fulfillment engine 133. In these implementations, the LLM engine 135 can process, using LLM(s) stored in the ML model(s) database 130A (e.g., PaLM, BARD, BERT, LaMDA, Meena, GPT, and/or any other LLM, such as any other LLM that is encoder-only based, decoder-only based, sequence-to-sequence based and that optionally includes an attention mechanism or other memory), the ASR output (or other typed or touch inputs received via the user input engine 120 of the client device 110) to generate LLM output.

In various implementations, the ASR output can include, for example, a plurality of speech hypotheses (e.g., term hypotheses and/or transcription hypotheses) that are predicted to correspond to spoken utterance(s) based on the processing of audio data that captures the spoken utterance(s). The ASR engine 131 can optionally select a particular speech hypotheses as recognized text for the spoken utterance(s) based on a corresponding value associated with each of the plurality of speech hypotheses (e.g., probability values, log likelihood values, and/or other values). In various implementations, the ASR model(s) stored in the ML model(s) database 130A are end-to-end speech recognition model(s), such that the ASR engine 131 can generate the plurality of speech hypotheses directly using the ASR model(s). For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms or other memory. In other implementations, the ASR model(s) are not end-to-end speech recognition model(s) such that the ASR engine 131 can instead generate predicted phoneme(s) (and/or other representations). For instance, the predicted phoneme(s) (and/or other representations) may then be utilized by the ASR engine 131 to determine a plurality of speech hypotheses that conform to the predicted phoneme(s). In doing so, the ASR engine 131 can optionally employ a decoding graph, a lexicon, and/or other resource(s). In various implementations, a corresponding transcription that includes the recognized text can be rendered at the client device 110.

In various implementations, the NLU output can include, for example, annotated recognized text that includes one or more annotations of the recognized text for one or more (e.g., all) of the terms of the recognized text. For example, the NLU engine 132 may include a part of speech tagger (not depicted) configured to annotate terms with their grammatical roles. Additionally, or alternatively, the NLU engine 132 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person).

The entity tagger may rely on content of the natural language input to resolve a particular entity and/or may optionally communicate with a knowledge graph or other entity database to resolve a particular entity. Additionally, or alternatively, the NLU engine 132 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 132 may rely on annotations from one or more other components of the NLU engine 132. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution. The user data may include, for example, historical location data, historical temporal data, user preference data, user account data, calendar information, email data, and/or any other user data that is accessible at the client device 110.

In various implementations, the fulfillment output can include, for example, one or more tasks to be performed by a voice-based chatbot and/or a voice-based chatbot policy override. For example, the user can provide unstructured free-form natural language input in the form of spoken utterance(s). The spoken utterance(s) can include, for instance, an indication of the one or more tasks to be performed by a voice-based chatbot. The one or more tasks may require the voice-based chatbot and/or the voice-based chatbot policy override to provide certain information to the user, engage with one or more external systems on behalf of the user (e.g., an inventory system, a reservation system, etc. via a remote procedure call (RPC)), and/or any other task that may be specified by the user and performed by the voice-based chatbot and/or the voice-based chatbot policy override. Accordingly, it should be understood that the fulfillment output may be based on the one or more tasks to be performed by the voice-based chatbot and/or the voice-based chatbot policy override and may be dependent on the corresponding conversations with the user.

In various implementations, the TTS engine 134 can generate synthesized speech audio data that captures computer-generated synthesized speech. The synthesized speech audio data can be rendered at the client device 110 via speaker(s) of the client device 110. The synthesized speech may include any output generated by the voice-based chatbot and/or the voice-based chatbot policy override as described herein, and may include, for example, synthesized speech generated as part of a dialog between the user of the client device 110 and the voice-based chatbot.

In various implementations, the LLM output can include, for example, a probability distribution over a sequence of tokens, such as words, phrases, or other semantic units, that are predicted to be responsive to the spoken utterance(s) provided by the user of the client device 110. Notably, the LLM(s) stored in the ML model(s) database 130A can include billions of weights and/or parameters that are learned through training the LLM on enormous amounts of diverse data. This enables these LLM(s) to generate the LLM output as the probability distribution over the sequence of tokens. In these implementations, the LLM engine 135 can replace the NLU engine 132 and/or the fulfillment engine 133 since these LLM(s) can perform the same or similar functionality in terms of natural language process-ing.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in commu-nication with the client device 110 and/or the voice-based chatbot policy override system 120 (e.g., over the one or more networks 199). As another example, a given client device can be utilized by multiple users in a shared setting (e.g., a group of users, a household, etc.). Additional descrip-tion of the request handling engine 140, the chatbot identi-fication engine 150, the policy override generation engine 160, the policy override inference engine 170, and the component activation engine 180 is provided herein (e.g., with respect to FIGS. 2, 3, and 4).

Referring now to FIG. 2, an example process 200 flow for utilizing a voice-based chatbot policy override 262A (e.g., accessible via the database 162A) in conjunction with an existing voice-based chatbot 292 (e.g., accessible via the database 191A and/or the database 192A) is depicted. For the sake of example, assume that the user of the client device 110 from FIG. 1 provides a spoken utterance as input at the client device 110 directed to an existing voice-based chatbot that is accessible via the client device 110 and as part of a corresponding conversation between the user of the client device 110 and the existing voice-based chatbot 292. The client device 110 may receive the spoken utterance via the user input engine 111 of the client device 110, and may generate audio data 201 that captures the spoken utterance. For the sake of example, assume that a voice-based chatbot policy override was previously generated (e.g., in the same or similar manner described with respect to FIG. 3) and is being utilized in conjunction with an existing voice-based chatbot (e.g., in the same or similar manner described with respect to FIG. 4).

Initially, the voice-based chatbot policy override 262A can process the audio data 201 to determine whether the voice-based chatbot policy override 262A should respond to the spoken utterance captured in the audio data 201 or the existing voice-based chatbot 292 should respond to the spoken utterance captured in the audio data 201. Notably, the voice-based chatbot policy override 262A is associated with one or more rules for when the voice-based chatbot policy override 262A should be utilized in responding to the spoken utterance captured in the audio data 201 and in lieu of the existing voice-based chatbot 292. For example, and as described with respect to FIG. 2, the voice-based chatbot policy override 262A can correspond to a machine learning (ML) model that is trained based on conversation(s) (e.g., stored in the database 161A) and rule(s) (e.g., stored in the database 161B). Not only can the rule(s) indicate when the voice-based chatbot policy override 262A should be utilized in responding to the spoken utterance captured in the audio data 201 and in lieu of the existing voice-based chatbot 292, but the rule(s) can also indicate how the voice-based chatbot policy override 262A should respond.

In some implementations, the rule(s) can indicate that the voice-based chatbot policy override 262A should be utilized in responding to the spoken utterance captured in the audio data 201 and in lieu of the existing voice-based chatbot 292 based on: recognized terms that are predicted to correspond to the spoken utterance captured in the audio data 201 (e.g., determined using the ASR engine 131 of the ML model engine 130), corresponding intent(s) and/or slot value(s) for parameter(s) associated with the corresponding intent(s) (e.g., determined using the NLU engine 132 and/or the LLM engine 135 of the ML model engine 130), a temporal period during which the corresponding conversation was initiated by the user of the client device 110, a location constraint associated with a geographical area in which the user of the client device 110 is located, and/or other rules. Further, and as noted above, the rule(s) can indicate how the voice-based chatbot policy override 262A should respond, and, assuming that the voice-based chatbot policy override 262A deter-mines that it should respond to the spoken utterance cap-tured in the audio data 201 (e.g., as indicated by decision block 202 feeding back into the voice-based chatbot policy override 262A), the policy override inference engine 170 can generate a voice-based chatbot policy override response 203 that is responsive to the spoken utterance captured in the audio data 201. The voice-based chatbot policy override response 203 can be provided to the rendering engine 112 of the client device 110, and the voice-based chatbot policy override response 203 can be audibly rendered for presen-tation to the user of the client device 110 as a response 205.

Notably, in implementations where the voice-based chat-bot policy override 262A determines that it should respond to the spoken utterance captured in the audio data 201, the component activation engine 180 can provide a signal to the existing voice-based chatbot 292 to activate one or more components of the existing voice-based chatbot 292 in anticipation of receiving an additional spoken utterance from the user of the client device 110 that will be handled by the existing voice-based chatbot 292. The components can include, for example, an ASR component (e.g., an instance of the ASR engine 131); a NLU component (e.g., an instance of the NLU engine 132); a fulfillment component (e.g., an instance of the fulfillment engine 133); or an LLM compo-nent (e.g., an instance of the LLM engine 135). Accordingly, latency can be reduced in responding to the additional spoken utterance provided by the user of the client device 110.

In contrast, assuming that the voice-based chatbot policy override 262A determines that the existing voice-based chatbot 292 should respond to the spoken utterance captured in the audio data 201 (e.g., as indicated by decision block 202 feeding into the existing voice-based chatbot 292), the existing voice-based chatbot 292 can utilize various com-ponents (e.g., components of the ML model engine 130 or an additional instance of the ML model engine 130) to generate a voice-based chatbot response 204 that is responsive to the spoken utterance captured in the audio data 201. The voice-based chatbot response 204 can be provided to the rendering engine 112 of the client device 110, and the voice-based chatbot policy override response 204 can be audibly ren-dered for presentation to the user of the client device 110 as a response 205.

Although the process flow 200 is described with respect to a single voice-based chatbot policy override being utilized in conjunction with an existing voice-based chatbot, it should be understood that is for the sake of example and is not meant to be limiting. Rather, it should be understood that multiple voice-based chatbot policy overrides can be utilized in conjunction with the existing voice-based chatbot. In implementations where multiple voice-based chatbot policy overrides are utilized in conjunction with the existing voice-based chatbot, the audio data 201 capturing the spoken utterance can be processed only a single time and each of the voice-based chatbot policy override can be evaluated based on the processing, or each of the voice-based chatbot policy overrides can separately process the audio data 201 capturing the spoken utterance. Further, it should be understood that a single voice-based chatbot policy override can be utilized in conjunction with multiple existing voice-based chatbots. In implementations where a single voice-based chatbot policy override is utilized in conjunction with the multiple existing voice-based chatbots, in some instance it can be determined that the voice-based chatbot policy override should be utilized in responding to the spoken utterance captured in the audio data 201 while other instances it can be determined that the existing voice-based chatbot should be utilized in responding to the spoken utterance captured in the audio data 201 (e.g., based on different temporal periods during which the corresponding conversations are initiated, based on different geographical areas in which different users are located, etc.).

Moreover, although the process flow 200 is described with respect to the voice-based chatbot policy override 262A only responding to a single turn of the corresponding conversation, it should be understood that is for the sake of example and is not meant to be limiting. Rather, it should be understood that the voice-based chatbot policy override 262A can handle multiple turns of the corresponding conversation, and that whether the voice-based chatbot policy override 262A handles multiple turns of the corresponding conversation may be dependent on the rule(s) associated with the voice-based chatbot policy override 262A and/or how the user of the client device 110 responds to the voice-based chatbot policy override response 203 that is audibly rendered as the response 205.

Turning now to FIG. 3, a flowchart illustrating an example method 300 of generating a voice-based chatbot policy override is depicted. For convenience, the operations of the method 300 are described with reference to a system that performs the operations. This system of the method 300 includes at least one processor, memory, and/or other component(s) of computing device(s) (e.g., client device 110 of FIG. 1, voice-based chatbot policy override system 120 of FIG. 1, computing device 510 of FIG. 5, and/or other computing devices). Moreover, while operations of the method 300 are shown in a particular order, this is not meant to be limiting. One or more operations may be reordered, omitted, and/or added.

At block 352, the system determines whether there is a need for a voice-based chatbot policy override for an existing voice-based chatbot that is associated with an entity. In some implementations, the system can receive an indication of a need for the voice-based chatbot policy override for the existing voice-based chatbot that is associated with the entity. For example, the request handling engine 140 of the voice-based chatbot policy override system 120 from FIG. 1 can receive a request from a 1P system (e.g., from among the 1P system(s) 191) to generate a voice-based chatbot policy override for a 1P voice-based chatbot (e.g., stored in the 1P voice-based chatbot(s) database 191A). As another example, the request handling engine 140 of the voice-based chatbot policy override system 120 from FIG. 1 can receive a request from a 3P system (e.g., from among the 3P system(s) 192) to generate a voice-based chatbot policy override for a 3P voice-based chatbot (e.g., stored in the 3P voice-based chatbot(s) database 192A). In these implementations, the chatbot identification engine 150 can identify the existing voice-based chatbot for which the voice-based chatbot policy override is to be generated.

In other implementations, the system can proactively determine that there is a need for the voice-based chatbot policy override for the existing voice-based chatbot that is associated with the entity. For example, the request handling engine 140 can determine that a new law or regulation has been passed in a certain geographical area that requires the existing voice-based chatbot to exhibit certain functionalities (e.g., to proactively identify itself as a voice-based chatbot upon initiation of the corresponding conversation, to reactively identify itself as a voice-based chatbot upon a human user asking if the voice-based chatbot is a person or a chatbot, to provide certain information when requested, to provide certain accessibility features, etc.). In these implementations, the chatbot identification engine 150 can identify the existing voice-based chatbot for which the voice-based chatbot policy override is to be generated.

If, at an iteration of block 352, the system determines that there is not a need for a voice-based chatbot policy override for the existing voice-based chatbot, then the system returns to block 352 to identify an additional existing voice-based chatbot that is deployed by the entity or an additional entity. If, at an iteration of block 352, the system determines that there is a need for a voice-based chatbot policy override for the existing voice-based chatbot, then the system proceeds to block 354 to begin generating the voice-based chatbot policy override for the existing voice-based chatbot.

At block 354, the system obtains a machine learning (ML) model. The ML model can be, for example, a question-answering (Q-A) ML model, a large language model (LLM), a recurrent neural network (RNN) ML model, a transformer ML model, and/or other ML models that optionally employ an attention mechanism or other memory. In some implementations, the ML model that is obtained may be based on the existing voice-based chatbot that is identified by the chatbot identification engine 150 and/or may be based on the functionality that is to be embodied by the voice-based chatbot policy override. For example, in some instances it may be desirable to utilize an ML model of a certain size (e.g., in terms of a number of parameters of the ML model) when memory is limited, whereas in other instances the size of the ML model may not be a factor. As another example, in some instances it may be desirable to utilize an ML model that has certain generative capabilities (e.g., LLMs), whereas in other instances whether the ML model has generative capabilities may not be a factor.

At block 356, the system obtains a plurality of training instances for training the ML model, each of the plurality of training instances including a corresponding conversation and one or more rules. For example, in generating a given training instance, of the plurality of training instances, the training instances engine 161 can obtain a corresponding conversation (e.g., from the database 161A). The corresponding conversation can be, for instance, a previously conducted conversation between the existing voice-based chatbot and a human user or an additional voice-based chatbot, a previously conducted conversation between an additional voice-based chatbot and a human user or a further additional voice-based chatbot, a curated conversation defined by a developer associated with one of the 1P system(s) 191 and/or the 3P system(s) 192, and/or other conversations. Further, in generating the given training instance, the training instances engine 161 can obtain one or more rules (e.g., from the database 161B) for when the voice-based chatbot policy override should be utilized in responding, and in lieu of the existing voice-based chatbot, and/or how the voice-based chatbot policy override should be utilized in responding, and in lieu of the existing voice-based chatbot. Notably, the one or more rules can be automatically determined by the system (e.g., based on passing of a law or regulation, etc.) or can be provided by a developer associated with one of the 1P system(s) 191 and/or the 3P system(s) 192.

At block 358, the system trains, based on the plurality of training instances, the ML model. Continuing with the above example, in training the ML model based on the given training instance, the training engine 162 can implement the operations of blocks 358A, 358B, and 358C to train the ML model that corresponds to the voice-based chatbot policy override. As indicated at sub-block 358A, the system can process, using the ML model, a dialog turn of the corresponding conversation to generate predicted output that predicts whether one or more of the rules indicate that the voice-based chatbot policy override should be utilized in responding to the dialog turn. Further, and as indicated at sub-block 358B, the system can generate, based on comparing the predicted output to ground truth output, a loss. Moreover, and as indicated at sub-block 358C, the system can update, based on the loss, the ML model. This process can be repeated for each of the plurality of training instances to generate the voice-based chatbot policy override.

For instance, assume that an existing voice-based chatbot was not initially trained to identify itself as a voice-based chatbot, and further assume that the system determines that there is a need for a voice-based chatbot policy override to provide this functionality to the existing voice-based chatbot. Accordingly, in this instance, the given training instance can include a dialog turn of a corresponding conversation that includes audio data and/or textual data corresponding to "are you a bot or a human?", and an indication of one or more rules that not only indicate the voice-based chatbot policy override should respond to the dialog turn of the corresponding conversation and in lieu of the existing voice-based chatbot but also that the voice-based chatbot policy override should respond to the dialog turn in the affirmative.

Thus, in training the ML model, the training engine 162 can cause the ML model to process the audio data and/or the textual data corresponding to "are you a bot or a human?", and the ML model can generate the predicted output indicative of whether the voice-based chatbot policy override should be utilized in responding to the dialog turn. The predicted output can include, for example, a numerical measure (e.g., a binary value, a probability, a log likelihood, etc.) indicating how confident the ML model is that the voice-based chatbot policy override should be utilized in responding to the dialog turn. The ground truth output can include, for example, an additional numerical measure (e.g., a binary value, a probability, a log likelihood, etc.) indicating whether the voice-based chatbot policy override, in fact, should be utilized in responding to the dialog turn. Accordingly, in generating the loss, the training engine 162 can compare the numerical measure and the additional numerical measure, and then cause the ML model to be updated based on the loss.

Although the voice-based chatbot policy override is described in the above example with respect to a need for a voice-based chatbot policy override to supplement functionality of the existing voice-based chatbot by identifying itself as a voice-based chatbot, it should be understood that is for the sake of example and is not meant to be limiting. Rather, it should be understood that the functionality of the voice-based chatbot policy override can be virtually limitless and based on requests received by the system. Put another way, the functionality of the voice-based chatbot policy override can depend not only on current functionality of the existing voice-based chatbot, but also on requests that are received by the system. For instance, additional rule(s) are described herein (e.g., with respect to FIGS. 2 and 4).

At block 360, the system causes the voice-based chatbot policy override to be provided to the existing voice-based chatbot for utilization in conjunction with the existing voice-based chatbot in engaging in corresponding conversations with corresponding human users. For example, and as described in more detail with respect to FIG. 4, the policy override inference engine 170 can cause the voice-based chatbot policy override to be provided to the existing voice-based chatbot for utilization in conjunction with the existing voice-based chatbot.

Turning now to FIG. 4, a flowchart illustrating an example method 400 of determining whether to utilize a voice-based chatbot policy override or an existing voice-based chatbot in generating a response during a corresponding conversation with a human user is depicted. For convenience, the operations of the method 400 are described with reference to a system that performs the operations. This system of the method 400 includes at least one processor, memory, and/or other component(s) of computing device(s) (e.g., client device 110 of FIG. 1, voice-based chatbot policy override system 120 of FIG. 1, computing device 510 of FIG. 5, and/or other computing devices). Moreover, while operations of the method 400 are shown in a particular order, this is not meant to be limiting. One or more operations may be reordered, omitted, and/or added.

At block 452, the system obtains a voice-based chatbot policy override for an existing voice-based chatbot, the voice-based chatbot policy override being associated with one or more rules for when to utilize the voice-based chatbot policy override in lieu of the existing voice-based chatbot. The voice-based chatbot policy override can be generated, for example, in the same or similar manner described with respect to the method 300 of FIG. 3. In some implementations, the existing voice-based chatbot can be a 1P voice-based chatbot, whereas in other implementations, the existing voice-based chatbot can be a 3P voice-based chatbot.

At block 454, the system receives, as part of a corresponding conversation with a human user via a client device of the human user, audio data that captures a spoken utterance of the human user. The audio data that captures the spoken utterance of the human user can be detected, for example, via the user input engine 111, and can be generated, for instance, by microphones of the client device of the human user. In some implementations, the corresponding conversation can be initiated by the human user (e.g., by the human user calling an entity that deploys the existing voice-based chatbot, by the human user invoking the existing voice-based chatbot locally at the client device, etc.). In other implementations, the corresponding conversation be initiated by the existing voice-based chatbot (e.g., by the existing voice-based chatbot calling the human user on behalf of an entity that deploys the existing voice-based chatbot, by the existing voice-based chatbot proactively initiating the conversation locally at the client device, etc.).

At block 456, the system determines whether to utilize the voice-based chatbot policy override in responding to the spoken utterance or the existing voice-based chatbot in responding to the spoken utterance. Notably, and as described with respect to FIG. 2, the policy override inference engine 170 can determine whether to utilize the voice-based chatbot policy override in responding to the spoken utterance or the existing voice-based chatbot in responding to the spoken utterance, and prior to any of the audio data being processed by the existing voice-based chatbot, based on one or more rules that were utilized in training the voice-based chatbot policy override.

In some implementations, the policy override inference engine 170 can determine whether to utilize the voice-based chatbot policy override in responding to the spoken utterance or the existing voice-based chatbot in responding to the spoken utterance based on processing the audio data capturing the spoken utterance. In some versions of those implementations, the policy override inference engine 170 can determine whether to utilize the voice-based chatbot policy override in responding to the spoken utterance or the existing voice-based chatbot in responding to the spoken utterance based on ASR output and/or NLU output generated based on processing the audio data that captures the spoken utterance. The ASR output and the NLU output can be generated in the same or similar described above with respect to the ASR engine 131 and NLU engine 132, respectively. For example, the ASR output and/or the NLU output can indicate that the spoken utterance includes particular words or phrases and/or solicits certain information for which the rule one or more rules associated with the voice-based chatbot policy override indicate that the voice-based chatbot policy override should be utilized in responding to the spoken utterance. Accordingly, if the ASR output and/or the NLU output indicate that the spoken utterance includes the particular words or phrases and/or solicits the certain information, then the policy override inference engine 170 can determine that the voice-based chatbot policy override should be utilized in responding to the spoken utterance. Otherwise, the policy override inference engine 170 can determine that the existing voice-based chatbot should be utilized in responding to the spoken utterance.

Some non-limiting examples of when the voice-based chatbot policy override may be associated with one or more rules that are based on processing the audio data capturing the spoken utterance can include, for instance, the voice-based chatbot policy override including functionality that is to be invoked based on the human user speaking one or more particular phrases, such as the human user requesting to speak to another human user, the human user inquiring whether the existing voice-based chatbot is a human or a machine, or the human user requesting that the existing voice-based chatbot interact with one or more external systems for which it was not trained to interact with (e.g., an inventory system, a reservation system, an authorization system, etc.). Although the above examples are provided, it should be understood that the purpose of the voice-based chatbot policy override can be virtually limitless.

In additional or alternative versions of those implementations, the policy override inference engine 170 can determine whether to utilize the voice-based chatbot policy override in responding to the spoken utterance or the existing voice-based chatbot in responding to the spoken utterance based on ASR output and/or LLM output generated based on processing the audio data that captures the spoken utterance. The ASR output and the LLM output can be generated in the same or similar described above with respect to the ASR engine 131 and LLM engine 135, respectively. For example, the ASR output and/or the LLM output can indicate that the spoken utterance includes particular words or phrases and/or solicits certain information for which the rule one or more rules associated with the voice-based chatbot policy override indicate that the voice-based chatbot policy override should be utilized in responding to the spoken utterance. Accordingly, if the ASR output and/or the LLM output indicate that the spoken utterance includes the particular words or phrases and/or solicits the certain information, then the policy override inference engine 170 can determine that the voice-based chatbot policy override should be utilized in responding to the spoken utterance. Otherwise, the policy override inference engine 170 can determine that the existing voice-based chatbot should be utilized in responding to the spoken utterance. Some non-limiting examples of when the voice-based chatbot policy override may be associated with one or more rules that include a temporal duration of time can include, for instance, the voice-based chatbot policy override including functionality that is being tested by the 1P entity or the 3P entity that is associated with the existing voice-based chatbot and without having to re-train the existing voice-based chatbot, and the voice-based chatbot policy override being deployed over a holiday or another particular duration of time and without having to re-train the existing voice-based chatbot.

In additional or alternative implementations, the policy override inference engine 170 can determine whether to utilize the voice-based chatbot policy override in responding to the spoken utterance or the existing voice-based chatbot in responding to the spoken utterance based on a temporal period during which the corresponding conversation is initiated. For example, the temporal period can indicate that the voice-based chatbot policy override should be utilized only during certain times of day, certain days of the week, certain days of the month, certain days of the year, etc. Accordingly, if the corresponding conversation is initiated during one of these temporal periods, then the policy override inference engine 170 can determine that the voice-based chatbot policy override should be utilized in responding to the spoken utterance. Otherwise, the policy override inference engine 170 can determine that the existing voice-based chatbot should be utilized in responding to the spoken utterance. One non-limiting examples of when the voice-based chatbot policy override may be associated with one or more rules that include a location constraint can include, for instance, the voice-based chatbot policy override including functionality that is required by recently passed laws or regulations, which may differ from geographical area to geographical area.

In additional or alternative implementations, the policy override inference engine 170 can determine whether to utilize the voice-based chatbot policy override in responding to the spoken utterance or the existing voice-based chatbot in responding to the spoken utterance based on a location constraint associated with a geographic region of the human user. For example, the location constraint can indicate that the voice-based chatbot policy override should be utilized if a current location of the human user (e.g., determined based on location sensor(s) of the client device of the human user, determined based on user profile data of a user profile of the human user, etc.) is within a certain geographical area. Accordingly, if the corresponding conversation is initiated while the human user is subject to the location constraint, then the policy override inference engine 170 can determine that the voice-based chatbot policy override should be utilized in responding to the spoken utterance. Otherwise, the policy override inference engine 170 can determine that the existing voice-based chatbot should be utilized in responding to the spoken utterance.

If, at an iteration of block 456, the system determine to utilize the voice-based chatbot policy override in responding to the spoken utterance, then the system proceeds to block 458. At block 458, the system generates, using the voice-based chatbot policy override, and based on processing the audio data, a voice-based chatbot policy override response that is responsive to the spoken utterance. At block 460, the system causes the voice-based chatbot policy override response to be audibly rendered for presentation to the human user via one or more speakers of the client device. The system can generate the voice-based chatbot policy override response that is responsive to the spoken utterance using the components described with respect to the voice-based chatbot policy override in FIGS. 1 and 2.

At block 462, the system activates one or more voice-based chatbot components that are to be utilized in processing additional audio data that captures an additional spoken utterance provided by the human user. For example, the component activation engine 180 can send a signal to the existing voice-based chatbot in anticipation of receiving an additional spoken utterance from the human user that will be handled by the existing voice-based chatbot. The components can include, for example, an ASR component (e.g., an instance of the ASR engine 131); a NLU component (e.g., an instance of the NLU engine 132); a fulfillment component (e.g., an instance of the fulfillment engine 133); and/or an LLM component (e.g., an instance of the LLM engine 135). Accordingly, latency can be reduced in responding to the additional spoken utterance provided by the human user of the client device. However, it should be noted that the voice-based chatbot policy override may handle multiple turns of the corresponding conversation. In these instances, the component activation engine 180 can refrain from sending a signal to the existing voice-based chatbot in anticipation of receiving an additional spoken utterance from the human user that will still be handled by the voice-based chatbot policy override, but then send the signal to the existing voice-based chatbot in anticipation of receiving a further additional spoken utterance from the human user that will be handled by the existing voice-based chatbot. Thus, the system can selectively send the signal to activate the one or more components of the existing voice-based chatbot for when it is predicted that the existing voice-based chatbot will handle a next dialog turn of the corresponding conversation. The system returns to block 454 to receive, as part of the corresponding conversation with the human user, additional audio data that captures an additional spoken utterance of the human user. Further, the system continues with the method 300 until the corresponding conversation is terminated (e.g., terminated explicitly or implicitly by the user, explicitly or implicitly by the existing voice-based chatbot, or otherwise).

If, at an iteration of block 456, the system determine to utilize the existing voice-based chatbot in responding to the spoken utterance, then the system proceeds to block 464. At block 464, the system generates, using the existing voice-based chatbot, and based on processing the audio data, a voice-based chatbot response that is responsive to the spoken utterance. At block 460, the system causes the voice-based chatbot response to be audibly rendered for presentation to the human user via one or more speakers of the client device. The system can generate the voice-based chatbot response that is responsive to the spoken utterance using the components described with respect to the existing voice-based chatbot in FIGS. 1 and 2. The system returns to block 454 to receive, as part of the corresponding conversation with the human user, additional audio data that captures an additional spoken utterance of the human user. Further, the system continues with the method 300 until the corresponding conversation is terminated (e.g., terminated explicitly or implicitly by the user, explicitly or implicitly by the existing voice-based chatbot, or otherwise).

Figure 5:
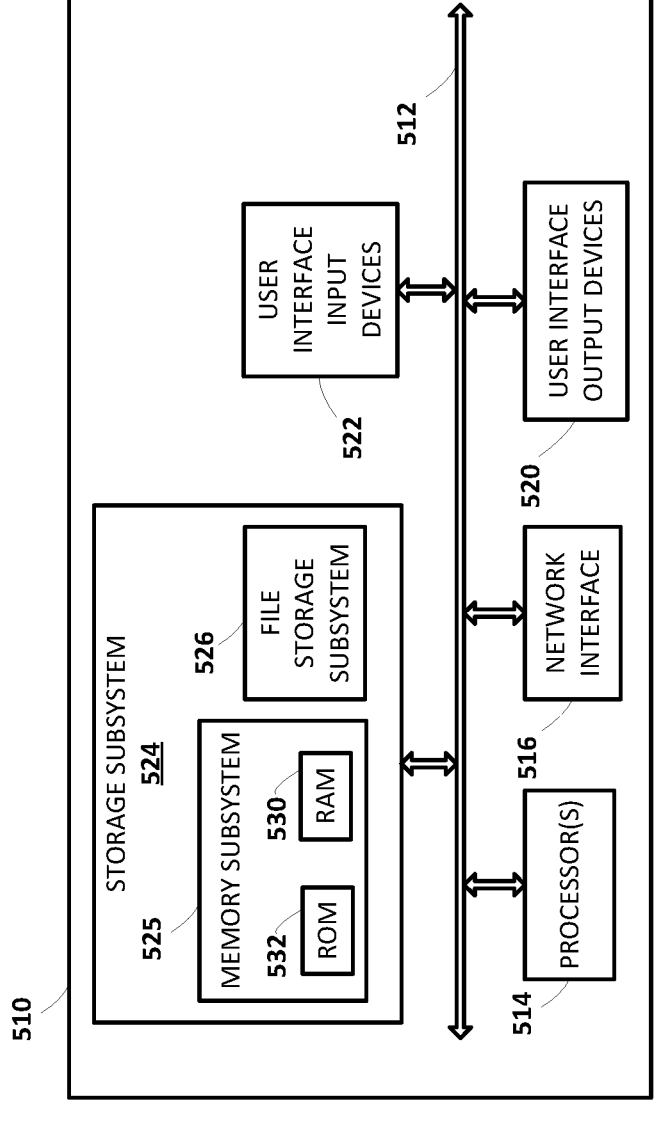
FIG. 5 depicts an example architecture of a computing device, in accordance with various implementations.

Turning now to FIG. 5, a block diagram of an example computing device 510 that may optionally be utilized to perform one or more aspects of techniques described herein. In some implementations, one or more of a client device, remote system component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1 and 2.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving, from a first-party entity, a voice-based chatbot policy override for an existing third-party voice-based chatbot that is managed by a third-party entity, the third-party entity being distinct from the first-party entity, and the voice-based chatbot policy override being associated with one or more rules for when to utilize the voice-based chatbot policy override in lieu of the third-party voice-based chatbot; and causing the existing third-party voice-based chatbot to engage in a corresponding conversation with a human user via a client device of the human user. Causing the existing third-party voice-based chatbot to engage in the corresponding conversation with the human user includes: receiving audio data that captures a spoken utterance provided by the human user; determining, based on processing the audio data that captures the spoken utterance and based on the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance; and in response to determining to utilize the voice-based chatbot policy override in responding to the spoken utterance: generating, using the voice-based chatbot policy override and in lieu of the third-party voice-based chatbot, and based on processing the audio data that captures the spoken utterance, a voice-based chatbot policy override response that is responsive to the spoken utterance; and causing the voice-based chatbot policy override response that is responsive to the spoken utterance to be audibly rendered for presentation to the human user via one or more speakers of the client device of the human user.

These and other implementations of technology disclosed herein can optionally include one or more of the following features.

In some implementations, the method may further include, while the voice-based chatbot policy override response that is responsive to the spoken utterance is being generated: activating one or more third-party voice-based chatbot components, of the existing third-party voice-based chatbot, that are to be utilized in processing additional audio data that captures an additional spoken utterance provided by the human user.

In some versions of those implementations, the method may further include, subsequent to causing the voice-based chatbot policy override response to the spoken utterance to be audibly rendered for presentation to the human user: receiving the additional audio data that captures the additional spoken utterance provided by the human user; generating, using the one or more third-party voice-based chatbot components, of the third-party voice-based chatbot, and in lieu of the voice-based chatbot policy override, and based on processing the additional audio data that captures the spoken utterance, a third-party voice-based chatbot response that is responsive to the additional spoken utterance; and causing the third-party voice-based chatbot response that is responsive to the additional spoken utterance to be audibly rendered for presentation to the human user via one or more of the speakers of the client device of the human user.

In additional or alternative versions of those implementations, the one or more third-party voice-based chatbot components may include one or more of: an automatic speech recognition (ASR) component; a natural language understanding (NLU) component; a fulfillment component; or a large language model (LLM) component.

In some implementations, determining whether to utilize the voice-based chatbot policy override in responding to the spoken utterance or the existing third-party voice-based chatbot in responding to the spoken utterance based on processing the audio data that captures the spoken utterance and based on the one or more rules for when to utilize the voice-based chatbot policy override in lieu of the third-party voice-based chatbot may include: processing, using an automatic speech recognition (ASR) model, the audio data that captures the spoken utterance to generate ASR output; processing, using a natural language understanding (NLU) model, the ASR output to generate NLU output; and determining, based on comparing the ASR output and/or the NLU output to the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance.

In some versions of those implementations, determining to utilize the voice-based chatbot policy override in responding to the spoken utterance may include: determining that the ASR output and/or the NLU output invokes one or more of the rules for when to utilize the voice-based chatbot policy override in lieu of the third-party voice-based chatbot.

In some implementations, determining whether to utilize the voice-based chatbot policy override in responding to the spoken utterance or the existing third-party voice-based chatbot in responding to the spoken utterance based on processing the audio data that captures the spoken utterance and based on the one or more rules for when to utilize the voice-based chatbot policy override in lieu of the third-party voice-based chatbot may include: processing, using an automatic speech recognition (ASR) model, the audio data that captures the spoken utterance to generate ASR output; processing, using large language model (LLM), the ASR output to generate LLM output; and determining, based on comparing the ASR output and/or the LLM output to the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance.

In some versions of those implementations, determining to utilize the voice-based chatbot policy override in responding to the spoken utterance may include determining that the ASR output and/or the LLM output invokes one or more of the rules for when to utilize the voice-based chatbot policy override in lieu of the third-party voice-based chatbot.

In some implementations, the existing third-party voice-based chatbot may be initially trained by the third-party entity.

In some implementations, the third-party entity may specify the one or more rules for when to utilize the voice-based chatbot policy override in lieu of the third-party voice-based chatbot.

In some implementations, an additional third-party entity, that is in addition to the third-party entity and the first-party entity, may specify the one or more rules for when to utilize the voice-based chatbot policy override in lieu of the third-party voice-based chatbot.

In some implementations, the voice-based chatbot policy override may correspond to a machine learning (ML) model that is trained based on a plurality of historical conversations and a description of the one or more rules for when to utilize the voice-based chatbot policy override.

In some versions of those implementations, the method may further include, prior to receiving the voice-based chatbot policy override for the existing third-party voice-based chatbot that is managed by the third-party entity: transmitting, to the first-party entity, an indication of a need for the voice-based chatbot policy override for the existing third-party voice-based chatbot.

In some further versions of those implementations, the voice-based chatbot policy override for the existing third-party voice-based chatbot may be proactively provided by the first-party entity and to the third-party entity.

In some additional or alternative further versions of those implementations, generating the voice-based chatbot policy override response that is responsive to the spoken utterance, using the voice-based chatbot policy override and in lieu of the third-party voice-based chatbot, and based on processing the audio data that captures the spoken utterance, may include: processing, using the ML model that corresponds to the voice-based chatbot policy override, automatic speech recognition (ASR) output and/or natural language understanding (NLU) output generated based on processing the spoken utterance to generate the voice-based chatbot policy override response.

In some implementations, the method may further include, in response to determining to utilize the third-party voice-based chatbot in responding to the spoken utterance: generating, using the third-party voice-based chatbot and in lieu of the voice-based chatbot policy override, a third-party voice-based chatbot response that is responsive to the spoken utterance; and causing the third-party voice-based chatbot response that is responsive to the spoken utterance to be audibly rendered for presentation to the human user via one or more of the speakers of the client device of the human user.

In some implementations, the corresponding conversation may be initiated by the human user by placing a telephone call to the third-party entity via the client device of the human user.

In some implementations, the corresponding conversation may be initiated by the existing third-party voice-based chatbot by placing a telephone call to the human user.

In some implementations, a method implemented by one or more processors is provided, and includes: generating a voice-based chatbot policy override for an existing voice-based chatbot, the voice-based chatbot policy override being associated with one or more rules for when to utilize the voice-based chatbot policy override in lieu of the voice-based chatbot; and causing the existing voice-based chatbot to engage in a corresponding conversation with a human user via a client device of the human user. Causing the existing voice-based chatbot to engage in the corresponding conversation with the human user includes: receiving audio data that captures a spoken utterance provided by the human user; determining, based on processing the audio data that captures the spoken utterance and based on the one or more rules for when to utilize the voice-based chatbot policy override in lieu of the voice-based chatbot, whether to utilize the voice-based chatbot policy override in responding to the spoken utterance or the existing voice-based chatbot in responding to the spoken utterance; and in response to determining to utilize the voice-based chatbot policy override in responding to the spoken utterance: generating, using the voice-based chatbot policy override and in lieu of the voice-based chatbot, and based on processing the audio data that captures the spoken utterance, a voice-based chatbot policy override response that is responsive to the spoken utterance; and causing the voice-based chatbot policy override response that is responsive to the spoken utterance to be audibly rendered for presentation to the human user via one or more speakers of the client device of the human user.

These and other implementations of technology disclosed herein can optionally include one or more of the following features.

In some implementations, the existing voice-based chatbot may be associated with a first-party entity, and the voice-based chatbot policy override may be generated by the first-party entity.

In some implementations, a method implemented by one or more processors is provided, and includes: receiving, from a first-party entity, a voice-based chatbot policy override for an existing third-party voice-based chatbot that is managed by a third-party entity, the third-party entity being distinct from the first-party entity, the voice-based chatbot policy override being associated with one or more rules for when to utilize the voice-based chatbot policy override in lieu of the third-party voice-based chatbot, and the one or more rules including at least a temporal period and/or location constraint for when to utilize the voice-based chatbot policy override in lieu of the third-party voice-based chatbot; and causing the existing third-party voice-based chatbot to engage in a corresponding conversation with a human user via a client device of the human user. Causing the existing third-party voice-based chatbot to engage in the corresponding conversation with the human user includes: receiving audio data that captures a spoken utterance provided by the human user; determining, based on the temporal period and/or the location constraint, whether to utilize the voice-based chatbot policy override in responding to the spoken utterance or the existing third-party voice-based chatbot in responding to the spoken utterance; and in response to determining to utilize the voice-based chatbot policy override in responding to the spoken utterance: generating, using the voice-based chatbot policy override and in lieu of the third-party voice-based chatbot, and based on processing the audio data that captures the spoken utterance, a voice-based chatbot policy override response that is responsive to the spoken utterance; and causing the voice-based chatbot policy override response that is responsive to the spoken utterance to be audibly rendered for presentation to the human user via one or more speakers of the client device of the human user.

These and other implementations of technology disclosed herein can optionally include one or more of the following features.

In some implementations, determining to utilize the voice-based chatbot policy override in responding to the spoken utterance may be based on determining that the corresponding conversation is occurring during the temporal period.

In some implementations, determining to utilize the voice-based chatbot policy override in responding to the spoken utterance may be based on determining that the human user is located within a certain geographical area defined by the location constraint.

In some implementations, the method may further include, in response to determining to utilize the third-party voice-based chatbot in responding to the spoken utterance: generating, using the third-party voice-based chatbot and in lieu of the voice-based chatbot policy override, a third-party voice-based chatbot response that is responsive to the spoken utterance; and causing the third-party voice-based chatbot response that is responsive to the spoken utterance to be audibly rendered for presentation to the human user via one or more of the speakers of the client device of the human user.

In some versions of those implementations, determining to utilize the third-party voice-based chatbot in responding to the spoken utterance may be based on determining that the corresponding conversation is not occurring during the temporal period and that the human user is not located within a certain geographical area defined by the location constraint.

In some implementations, using the voice-based chatbot policy override and in lieu of the third-party voice-based chatbot in generating the voice-based chatbot policy override response that is responsive to the spoken utterance may enable the third-party entity to test functionality that has not been deployed by the third-party voice-based chatbot.

In some implementations, a method implemented by one or more processors is provided, and includes: generating a voice-based chatbot policy override for an existing voice-based chatbot, the voice-based chatbot policy override being associated with one or more rules for when to utilize the voice-based chatbot policy override in lieu of the voice-based chatbot, and the one or more rules including at least a temporal period and/or location constraint for when to utilize the voice-based chatbot policy override in lieu of the voice-based chatbot; and causing the existing chatbot to engage in a corresponding conversation with a human user via a client device of the human user. Causing the existing chatbot to engage in the corresponding conversation with the human user includes: receiving audio data that captures a spoken utterance provided by the human user; determining, based on the temporal period and/or the location constraint, whether to utilize the voice-based chatbot policy override in responding to the spoken utterance or the existing voice-based chatbot in responding to the spoken utterance; and in response to determining to utilize the voice-based chatbot policy override in responding to the spoken utterance: generating, using the voice-based chatbot policy override and in lieu of the voice-based chatbot, and based on processing the audio data that captures the spoken utterance, a voice-based chatbot policy override response that is responsive to the spoken utterance; and causing the voice-based chatbot policy override response that is responsive to the spoken utterance to be audibly rendered for presentation to the human user via one or more speakers of the client device of the human user.

These and other implementations of technology disclosed herein can optionally include one or more of the following features.

In some implementations, the existing voice-based chatbot may be associated with a first-party entity, and the voice-based chatbot policy override may be generated by the first-party entity.

In some implementations, a method implemented by one or more processors is provided, and includes: determining, based on current functionality of an existing voice-based chatbot that is deployed by an entity, whether there is a need to provide a voice-based chatbot policy override to supplement the current functionality of the existing voice-based chatbot without having to re-train the existing voice-based chatbot; in response to determining that there is a need to provide a voice-based chatbot policy override to supplement the current functionality of the existing voice-based chatbot without having to re-train the existing voice-based chatbot: generating the voice-based chatbot policy override to supplement the current functionality of the existing voice-based chatbot. Generating the voice-based chatbot policy override to supplement the current functionality of the existing voice-based chatbot includes: obtaining a machine learning (ML) model; obtaining a plurality of training instances for training the ML model, each of the plurality of training instances including a corresponding conversation and one or more rules that supplement the current functionality of the existing voice-based chatbot; and training, based on the plurality of training instances, the ML model. The method further includes causing the voice-based chatbot policy override to be provided to the existing voice-based chatbot. Causing the voice-based chatbot policy override to be provided to the existing voice-based chatbot causes the voice-based chatbot policy override to be utilized in conjunction with the existing voice-based chatbot in engaging in corresponding conversations with corresponding human users.

These and other implementations of technology disclosed herein can optionally include one or more of the following features.

In some implementations, training the ML model based on a given training instance, of the plurality of training instances, may include: processing, using the ML model, a dialog turn of the corresponding conversation, of the given training instance, to generate predicted output that predicts whether the one or more rules indicate that the voice-based chatbot policy override should be utilized in responding to the dialog turn of the corresponding conversation; generating, based on comparing the predicted output to ground truth output, a loss; and updating, based on the loss, the ML model.

These and other implementations of technology disclosed herein can optionally include one or more of the following features.

In some implementations, the ML model may be a question-answering (Q-A) ML model.

In some implementations, the ground truth output may indicate whether the one or more rules indicate that the voice-based chatbot policy override should be utilized in responding to the dialog turn of the corresponding conversation.

In some implementations, a method implemented by one or more processors is provided, and includes: receiving an indication of a need to provide a voice-based chatbot policy override to supplement current functionality of an existing voice-based chatbot that is deployed by an entity and without having to re-train the existing voice-based chatbot; and in response to receiving the indication that there is a need to provide a voice-based chatbot policy override to supplement the current functionality of the existing voice-based chatbot without having to re-train the existing voice-based chatbot: generating the voice-based chatbot policy override to supplement the current functionality of the existing voice-based chatbot. Generating the voice-based chatbot policy override to supplement the current functionality of the existing voice-based chatbot includes: obtaining a machine learning (ML) model; obtaining a plurality of training instances for training the ML model, each of the plurality of training instances including a corresponding conversation and one or more rules that supplement the current functionality of the existing voice-based chatbot; and training, based on the plurality of training instances, the ML model. The method further includes causing the voice-based chatbot policy override to be provided to the existing voice-based chatbot. Causing the voice-based chatbot policy override to be provided to the existing voice-based chatbot causes the voice-based chatbot policy override to be utilized in conjunction with the existing voice-based chatbot in engaging in corresponding conversations with corresponding human users.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:

receiving, from a first-party entity, a voice-based chatbot policy override for an existing third-party voice-based chatbot that is managed by a third-party entity, the third-party entity being distinct from the first-party entity, the voice-based chatbot policy override being associated with one or more rules for when to utilize the voice-based chatbot policy override in lieu of the third-party voice-based chatbot, the voice-based chatbot policy override corresponding to a machine learning (ML) model that is trained based on a plurality of historical conversations and a description of the one or more rules for when to utilize the voice-based chatbot policy override, and the voice-based chatbot policy override for the existing third-party voice-based chatbot being proactively provided by the first-party entity and to the third-party entity; and causing the existing third-party voice-based chatbot to engage in a corresponding conversation with a human user via a client device of the human user, wherein causing the existing third-party voice-based chatbot to engage in the corresponding conversation with the human user comprises:

receiving audio data that captures a spoken utterance provided by the human user;

determining, based on processing the audio data that captures the spoken utterance and based on the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance; and in response to determining to utilize the voice-based chatbot policy override in responding to the spoken utterance:

generating, using the voice-based chatbot policy override and in lieu of the third-party voice-based chatbot, and based on processing the audio data that captures the spoken utterance, a voice-based chatbot policy override response that is responsive to the spoken utterance; and causing the voice-based chatbot policy override response that is responsive to the spoken utterance to be audibly rendered for presentation to the human user via one or more speakers of the client device of the human user.

2. The method of claim 1, further comprising:

while the voice-based chatbot policy override response that is responsive to the spoken utterance is being generated:

activating one or more third-party voice-based chatbot components, of the existing third-party voice-based chatbot, that are to be utilized in processing additional audio data that captures an additional spoken utterance provided by the human user.

3. The method of claim 2, further comprising:

subsequent to causing the voice-based chatbot policy override response to the spoken utterance to be audibly rendered for presentation to the human user:

receiving the additional audio data that captures the additional spoken utterance provided by the human user;

generating, using the one or more third-party voice-based chatbot components, of the third-party voice-based chatbot, and in lieu of the voice-based chatbot policy override, and based on processing the additional audio data that captures the additional spoken utterance, a third-party voice-based chatbot response that is responsive to the additional spoken utterance; and causing the third-party voice-based chatbot response that is responsive to the additional spoken utterance to be audibly rendered for presentation to the human user via one or more of the speakers of the client device of the human user.

4. The method of claim 2, wherein the one or more third-party voice-based chatbot components comprise one or more of:

an automatic speech recognition (ASR) component;
a natural language understanding (NLU) component;
a fulfillment component; or
a large language model (LLM) component.

5. The method of claim 1, wherein determining whether to utilize the voice-based chatbot policy override in responding to the spoken utterance or the existing third-party voice-based chatbot in responding to the spoken utterance based on processing the audio data that captures the spoken utterance and based on the one or more rules for when to utilize the voice-based chatbot policy override in lieu of the third-party voice-based chatbot comprises:

processing, using an automatic speech recognition (ASR) model, the audio data that captures the spoken utterance to generate ASR output;

processing, using a natural language understanding (NLU) model, the ASR output to generate NLU output; and determining, based on comparing the ASR output and/or the NLU output to the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance.

6. The method of claim 5, wherein determining to utilize the voice-based chatbot policy override in responding to the spoken utterance comprises:

determining that the ASR output and/or the NLU output invokes one or more of the rules for when to utilize the voice-based chatbot policy override in lieu of the third-party voice-based chatbot.

7. The method of claim 1, wherein determining whether to utilize the voice-based chatbot policy override in responding to the spoken utterance or the existing third-party voice-based chatbot in responding to the spoken utterance based on processing the audio data that captures the spoken utterance and based on the one or more rules for when to utilize the voice-based chatbot policy override in lieu of the third-party voice-based chatbot comprises:

processing, using an automatic speech recognition (ASR) model, the audio data that captures the spoken utterance to generate ASR output;

processing, using a large language model (LLM), the ASR output to generate LLM output; and determining, based on comparing the ASR output and/or the LLM output to the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance.

8. The method of claim 7, wherein determining to utilize the voice-based chatbot policy override in responding to the spoken utterance comprises:

determining that the ASR output and/or the LLM output invokes one or more of the rules for when to utilize the voice-based chatbot policy override in lieu of the third-party voice-based chatbot.

9. The method of claim 1, wherein the existing third-party voice-based chatbot is initially trained by the third-party entity.

10. The method of claim 1, wherein the third-party entity specifies the one or more rules for when to utilize the voice-based chatbot policy override in lieu of the third-party voice-based chatbot.

11. The method of claim 1, wherein an additional third-party entity, that is in addition to the third-party entity and the first-party entity, specifies the one or more rules for when to utilize the voice-based chatbot policy override in lieu of the third-party voice-based chatbot.

12. The method of claim 1, wherein generating the voice-based chatbot policy override response that is responsive to the spoken utterance, using the voice-based chatbot policy override and in lieu of the third-party voice-based chatbot, and based on processing the audio data that captures the spoken utterance, comprises:

processing, using the ML model that corresponds to the voice-based chatbot policy override, automatic speech recognition (ASR) output and/or natural language understanding (NLU) output generated based on processing the spoken utterance to generate the voice-based chatbot policy override response.

13. The method of claim 1, further comprising:

in response to determining to utilize the third-party voice-based chatbot in responding to the spoken utterance:

generating, using the third-party voice-based chatbot and in lieu of the voice-based chatbot policy override, a third-party voice-based chatbot response that is responsive to the spoken utterance; and causing the third-party voice-based chatbot response that is responsive to the spoken utterance to be audibly rendered for presentation to the human user via one or more of the speakers of the client device of the human user.

14. The method of claim 1, wherein the corresponding conversation is initiated by the human user by placing a telephone call to the third-party entity via the client device of the human user.

15. The method of claim 1, wherein the corresponding conversation is initiated by the existing third-party voice-based chatbot by placing a telephone call to the human user.

16. A system comprising:

at least one processor; and memory storing instructions that, when executed, cause the at least one processor to be operable to;

receive, from a first-party entity, a voice-based chatbot policy override for an existing third-party voice-based chatbot that is managed by a third-party entity, the third-party entity being distinct from the first-party entity, the voice-based chatbot policy override being associated with one or more rules for when to utilize the voice-based chatbot policy override in lieu of the third-party voice-based chatbot, the voice-based chatbot policy override corresponding to a machine learning (ML) model that is trained based on a plurality of historical conversations and a description of the one or more rules for when to utilize the voice-based chatbot policy override, and the voice-based chatbot policy override for the existing third-party voice-based chatbot being proactively provided by the first-party entity and to the third-party entity; and cause the existing third-party voice-based chatbot to engage in a corresponding conversation with a human user via a client device of the human user, wherein the instructions to cause the existing third-party voice-based chatbot to engage in the corresponding conversation with the human user comprise instructions to:

receive audio data that captures a spoken utterance provided by the human user;

determine, based on processing the audio data that captures the spoken utterance and based on the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance; and in response to determining to utilize the voice-based chatbot policy override in responding to the spoken utterance:

generate, using the voice-based chatbot policy override and in lieu of the third-party voice-based chatbot, and based on processing the audio data that captures the spoken utterance, a voice-based chatbot policy override response that is responsive to the spoken utterance; and cause the voice-based chatbot policy override response that is responsive to the spoken utterance to be audibly rendered for presentation to the human user via one or more speakers of the client device of the human user.

17. The system of claim 16, wherein the existing third-party voice-based chatbot is initially trained by the third-party entity.

18. The system of claim 16, wherein the third-party entity specifies the one or more rules for when to utilize the voice-based chatbot policy override in lieu of the third-party voice-based chatbot.

19. The system of claim 16, wherein an additional third-party entity, that is in addition to the third-party entity and the first-party entity, specifies the one or more rules for when to utilize the voice-based chatbot policy override in lieu of the third-party voice-based chatbot.

20. A non-transitory computer-readable medium storing instructions that, when executed by at least one processor, cause the at least one processor to perform operations to:

receive, from a first-party entity, a voice-based chatbot policy override for an existing third-party voice-based chatbot that is managed by a third-party entity, the third-party entity being distinct from the first-party entity, the voice-based chatbot policy override being associated with one or more rules for when to utilize the voice-based chatbot policy override in lieu of the third-party voice-based chatbot, the voice-based chatbot policy override corresponding to a machine learning (ML) model that is trained based on a plurality of historical conversations and a description of the one or more rules for when to utilize the voice-based chatbot policy override, and the voice-based chatbot policy override for the existing third-party voice-based chatbot being proactively provided by the first-party entity and to the third-party entity; and cause the existing third-party voice-based chatbot to engage in a corresponding conversation with a human user via a client device of the human user, wherein the operations to cause the existing third-party voice-based chatbot to engage in the corresponding conversation with the human user comprise operations to:

receive audio data that captures a spoken utterance provided by the human user;

determine, based on processing the audio data that captures the spoken utterance and based on the one or more rules for when to utilize the voice-based chatbot policy override in lieu of the third-party voice-based chatbot, whether to utilize the voice-based chatbot policy override in responding to the spoken utterance or the existing third-party voice-based chatbot in responding to the spoken utterance; and in response to determining to utilize the voice-based chatbot policy override in responding to the spoken utterance:

generate, using the voice-based chatbot policy override and in lieu of the third-party voice-based chatbot, and based on processing the audio data that captures the spoken utterance, a voice-based chatbot policy override response that is responsive to the spoken utterance; and cause the voice-based chatbot policy override response that is responsive to the spoken utterance to be audibly rendered for presentation to the human user via one or more speakers of the client device of the human user.

\*    \*    \*    \*    \*